C. ELLIS.
PROCESS OF HYDROGENATION.
APPLICATION FILED APR. 24, 1912.
1,040,531.
Patented Oct. 8, 1912.
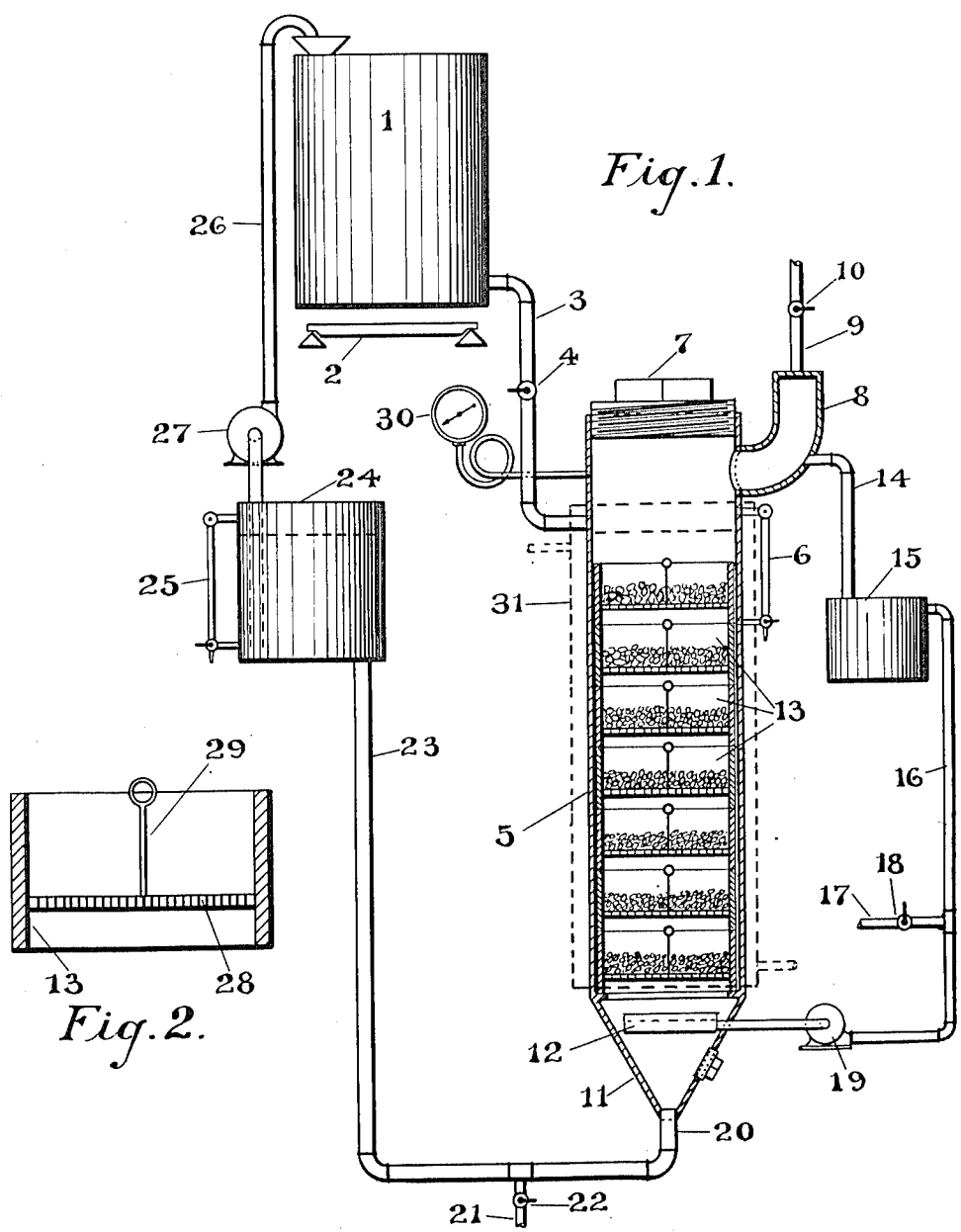
WITNESSES:
B. M. Ellis.
J. O. Hawthorn
INVENTOR
Carleton Ellis

UNITED STATES PATENT OFFICE.

CARLETON ELLIS, OF MONTCLAIR, NEW JERSEY.

PROCESS OF HYDROGENATION.

1,040,531.     Specification of Letters Patent.     Patented Oct. 8, 1912.

Application filed April 24, 1912. Serial No. 692,902.

*To all whom it may concern:*

Be it known that I, CARLETON ELLIS, a citizen of the United States, and a resident of Montclair, in the county of Essex and State of New Jersey, have invented certain new and useful Improvements in Processes of Hydrogenation, of which the following is a specification.

This invention relates to a method of treating unsaturated organic mineral, such as fatty acids and their esters and petroleum or other hydrocarbon oils, with hydrogen or hydrogen-containing gas, in the presence of a catalytic agent for the purpose of saturating to a greater or less extent the unsaturated components of said material.

The addition of hydrogen to unsaturated organic compounds as brought about by catalytic action of various metallic compounds, such as platinum, palladium, nickel and the like, as well as the oxids of certain metals, has been the subject of many investigations, which embraces the work of Sabatier and Senderens, Mailhe, Henle, Willstatter and Mayer, Paal and Amberger, Paal and Gerum, Paal and Roth, Paal and Hartmann, Ipatiew, Padvua and Carughi, Ipatiew and Philipow, Jakolew, Rakitin and others. From a technical point of view, especially as regards the treatment of oily or fattey material and other oils, the subject has been investigated by Le Prince and Sievecke, Norman, Erdmann, Bedford, Crosfield, Schwoerer, Kayser, Wilbusewitch, Day and others.

It is the object of the present invention to provide a simple, cheap, and ready method of forming saturated fatty, or other materials, which shall be free from the disadvantages of the older methods and which shall have certain new and valuable advantages, giving enhanced yields, with a simpler, surer and less laborious operation.

In the preferred form of my invention, which involves conducting the operation of hydrogenation in a continuous way, the unsaturated material, as for example, cottonseed oil or oleic acid, is passed through a tower, preferably of considerable height in the form of a traveling stream, which progressively advances against a counter-current of hydrogen or hydrogen containing gas, as water gas, for instance. The tower is filled more or less with catalytic material, including such catalysts as finely divided metallic nickel, copper, iron, palladium, platinum, cobalt, chromium, manganese, vanadium, tungsten, selenium, aluminum and the like. The catalyzing material is preferably supported on a carrier, composed of coarse granules of inert material such as pumice, or other porous stone. Or material capable of occluding hydrogen may be used as a support for the metallic or other catalytic body.

When water gas is used as the reducing medium, it may be passed, as stated, in a direction counter to that of the flow of the unsaturated material. The hydrogen is gradually removed during this stage, so that when the gas finally discharges from the tower it has become largely depleted of its original content of hydrogen. This brings into play, an important feature on which depends the rapidity of operation and satisfactory consummation of the reaction. Water gas is one of the cheapest sources of hydrogen and after its hydrogen content has been extracted more or less, the residual gas may be used for heating or lighting purposes without waste. If water gas is introduced into a vessel containing oil and a catalyst and the vessel heated, the hydrogen is absorbed rapidly at first, then more slowly as the oil becomes somewhat saturated. Now, as the avidity of the oil for hydrogen decreases with increasing absorption of the gas, the partial pressure of hydrogen in the circumambient gas decreases, making completion of the reaction difficult and slow. In the treatment of cotton seed oil, for example, where a titre of about 65° is required, the last additions of hydrogen take place very slowly. When using water gas in accordance with the present invention, fresh water gas with its full complement of hydrogen comes into contact with the nearly saturated oil, thus completing the reaction; while fresh oil comes into contact with the gas of reduced hydrogen content, from which however, a substantial quantity of hydrogen is extracted due to the avidity of fresh oil for hydrogen. According to the material under treatment, the temperature may be varied to suit the particular requirements, or varied during the operation. With a nickel catalyst, a temperature of about 175° C. is satisfactory, variations ordinarily between 150° and 200° C. being sometimes required. The treatment of oils which are discolored or injuriously effected by these temperatures may take place at temperatures less than 150° C. if a very sensitive catalyst is employed. Similarly, the pressure of the hydrogen gas may be varied to suit the particular requirements, or varied during the operation. With very active catalytic material, ordinary atmospheric pressure, or thereabouts may be employed, while with catalysts of a less sensitive nature pressures of from ten to fifty pounds per square inch may sometimes be required.

When practically pure hydrogen instead of water gas is used, it is preferable to cause the gas to travel rapidly through the stream, or down-flowing current of oil at a speed much greater than its rate of absorption, so that a considerable volume of excess gas is withdrawn at the top of the tower. Thus, the unabsorbed portions of the hydrogen gas travel in a cyclic path and the more rapid flow of the gaseous current which is thus created somewhat favors absorption. The oil or other material which is being treated may similarly be passed through a treating chamber at a speed greater than that which permits of complete saturation during a single course through the treating chamber and the incompletely treated oil may be returned to the upper part of the tower and again rapidly passed therethrough as a cyclic current.

In the preferred form of the present invention, apparatus is employed, which involves a treating chamber or tower having baskets disposed one above the other vertically and these baskets are filled with granular catalytic material or granular material coated with a catalyst. A leveling tank maintains the level of the oil in the tower constant at a point near the top. Hydrogen is delivered at the bottom of the tower through a rose or other suitable distributing device and passes up through basket after basket finally being removed at the top of the tower. The gas is prevented from following the walls by means of downwardly projecting rims on the baskets. The hydrogen which is withdrawn may be washed and then returned to the bottom of the tower. The oil is circulated in a similar manner if desired, the oil being pumped from a leveling tank into a storage and heating tank, where it is maintained at a temperature of 175 C., or whatever temperature may be required to hold the oil under the proper treating conditions. The oil thus entering the tower passes as an uninterrupted stream from basket to basket meeting in its downward course the upcoming current of hydrogen, and finally the oil is removed at the bottom of the tower more or less hydrogenized, where it may be drawn off or returned to the leveling tank to resume its cyclic travel.

If desired, nickel carbonyl, or other potentially catalytic body may be added to the oil to furnish active catalytic material on heating.

As stated, the oil travels through the treating tower preferably as an uninterrupted stream, that is to say, it fills the tower almost completely, with the exception of such displacement as is caused by the hydrogen current and the presence of the baskets with their charge of catalytic material. Such a method of operation is preferable to that of causing the oil to trickle through the catalyzer in drops, or discontinuous streams, owing to the better diffusion of the more nearly saturated portions of the oil in contact with the granular material, with the less completely treated portions of the oil adjacent to the granular material.

The accompanying drawing shows in a diagrammatic way apparatus suitable for carrying out the present invention.

In Figure 1, the treating chamber or tower is shown in vertical section, other parts being shown in side elevation. Fig. 2 shows a section of the basket for holding catalytic material.

Like characters denote like parts in the drawings.

In the drawings, 1 is a tank for holding oil, which may be heated by means of the grate 2.

3 is a pipe having a valve 4, leading to the treating tower 5.

6 is a gage showing the level of the oil.

7 is a removable head in the upper part of the treating tower 5.

8 is a gas outlet chamber having a gas exhaust pipe 9, controlled by valve 10.

The lower part of the treating tank is conical, as shown at 11. In this portion of the tower is placed the gas distributer 12. Baskets carrying catalytic material are shown vertically arranged in the treating tank at 13. The bottoms of these baskets are perforated as shown at 28 in Fig. 2.

29 is a rod and loop for removing the baskets from the tower.

From the gas collecting chamber 8, a pipe 14, leads to the gas purifier tank 15. From this tank a pipe 16 leads to the distributer 19. An inlet pipe 17, carrying the valve 18, serves for the admission of a fresh supply of hydrogen gas or water gas and the like which, if desired, may carry a small proportion of nickel carbonyl. From the bottom of the treating chamber, a pipe 20 leads to the leveling tank 24, which tank is provided with an oil level gage 25. The pipe 20 is provided with a blow-off pipe 21, carrying a valve 22. The pipe 26 connects the tank 24 with the tank 1. Interposed in this pipe is the oil pump 27.

30 is a gage to indicate the gas pressure.

The operation of the process is as follows: Oil contained in the tank 1, is allowed to pass by the way of the pipe 3, into the treating tower 5. There it passes downwardly through the catalyzer contained in the basket 13, and discharges through the pipe 20. It is then carried back to the tank 24, and elevated by the pump 27, to the tank 1. This operation or cyclic travel of the oil, is repeated until a sufficient degree of hydrogenation is secured. The treated oil may be run off by means of the pipe 21, supplied with the valve 22. Hydrogen gas enters by the inlet pipe 17, and is passed by the pump 19, into the treating tower 5. The gas passes upwardly through the layers of catalytic material and collects at the top of the treating tower. It is withdrawn at this point, passed through the purifier 15, and again returned to the bottom of the treating tower. Fresh hydrogen may be admitted as required by means of the inlet pipe 17. The amount of gas admitted at this point determines the pressure in the tower, and this pressure may be regulated in accordance with the degree of hydrogenation desired, or the character of the oil.

This application is in part a divisional continuation of U. S. Letters Patent, Serial No. 1,026,156, of May 14, 1912 as regards contacting a stream of oil with catalyzer in the presence of hydrogen moving as a counter-current, removing the excess of hydrogen, causing said excess to become a part of said counter-current, in removing the oil and in causing at least a portion of it to again become a part of the said stream of oil. This application is likewise a divisional continuation of Serial No. 686,988, filed March 29, 1912, as regards the distribution of the gas in a substantially uniform manner throughout the porous beds.

What I claim is:—

1. The process of treating oily material comprising unsaturated bodies which comprises moving a column of said oily material in a heated condition and in a liquid state and as a substantially traveling stream through a plurality of beds of porous solid material comprising a catalytic body, in simultaneously passing a counter-current of a hydrogen-containing gas substantially uniformly through said beds of porous solid material and said oily material, in removing the excess of hydrogen, in causing said excess to again become a part of said counter-current, in removing the oil and in causing at least a portion of it to again become a part of said column.

2. The process of treating oily material comprising unsaturated bodies which comprises moving a column of said oily material in a heated condition and in a liquid state and as a substantially traveling stream through a plurality of beds of porous solid material comprising a catalytic body, in simultaneously passing a counter-current of hydrogen under pressure and substantially uniformly through said beds of porous solid material and said oily material, in removing the excess of hydrogen, in causing said excess to again become a part of said counter-current, in removing the oil and in causing at least a portion of it to again become a part of said column.

3. The process of treating oily material comprising unsaturated bodies which comprises moving a column of said oily material in a liquid state and heated to a temperature of between 150° C. and 200° C. and as a substantially traveling stream through a plurality of beds of porous solid material comprising a catalytic body of a metallic character, in simultaneously passing a counter-current of hydrogen under a pressure of at least 10 pounds per square inch and substantially uniformly through said beds of porous solid material and said oily material, in removing the excess of hydrogen and purifying same, in causing the purified excess to again become a part of said counter-current, in removing the oil and in causing at least a portion of it to again become a part of said column.

4. The process of treating oily material comprising unsaturated bodies which comprises moving a column of said oily material in a liquid state and heated to a temperature of between 160° and 200° C. and as a substantially traveling stream through a plurality of separate beds of porous solid material comprising a catalytic body of a metallic character, in simultaneously passing a counter-current of hydrogen under a pressure of at least 10 pounds per square inch and substantially uniformly through said beds of porous solid material and said oily material, in removing the excess of hydrogen and purifying same, in causing the purified excess to again become a part of said counter-current, in removing the oil and in causing at least a portion of it to again become a part of said column.

Signed at Montclair in the county of Essex and State of New Jersey this 22nd day of April A. D. 1912.

CARLETON ELLIS.

Witnesses:
BIRDELLA M. ELLIS,
THOS. F. ROCHE.